(12) United States Patent
Kosakai et al.

(10) Patent No.: US 6,730,276 B2
(45) Date of Patent: May 4, 2004

(54) PLASTIC FILM ELECTROSTATIC ADSORPTION APPARATUS AND ELECTROSTATIC ADSORPTION METHOD

(75) Inventors: Mamoru Kosakai, Funabashi (JP); Kazunori Ishimura, Funabashi (JP); Teruyasu Fujita, Funabashi (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 190 days.

(21) Appl. No.: 09/909,075

(22) Filed: Jul. 18, 2001

(65) Prior Publication Data

US 2002/0008015 A1 Jan. 24, 2002

(30) Foreign Application Priority Data

Jul. 24, 2000 (JP) ........................................ 2000-223029

(51) Int. Cl.[7] .................................................. B01J 19/08
(52) U.S. Cl. ............................ 422/186.05; 422/186.04; 361/234; 361/233
(58) Field of Search .................. 422/186.05, 186.04; 361/234, 233

(56) References Cited

U.S. PATENT DOCUMENTS 5,748,436 A * 5/1998 Honma et al. ............. 361/234

FOREIGN PATENT DOCUMENTS

| JP | 5-6933 | 1/1993 |
| JP | 6-177231 | 6/1994 |
| JP | 7-297265 | 11/1995 |
| JP | 2000-3904 | 1/2000 |

* cited by examiner

*Primary Examiner*—Kishor Mayekar
(74) *Attorney, Agent, or Firm*—Sierra Patent Group, Ltd.

(57) ABSTRACT

The plastic film electrostatic adsorption apparatus of the present invention comprises an electrostatic adsorption electrode, an insulated dielectric layer that covers the electrostatic adsorption electrode and has a center line average roughness of an adsorption surface on which a plastic film is placed of 0.5 micrometers or less, and a power supply electrode that applies a voltage to the electrostatic adsorption electrode. According to this plastic film electrostatic adsorption apparatus, surface treatment can be performed even in a vacuum without requiring tedious work such as application or removal of adhesive. In addition, even if the plastic film expands and deforms due to heat treatment and plasma treatment performed during surface treatment, there is no occurrence of wrinkling, deformation or separation in the plastic film due to the difference in thermal expansion between the electrostatic adsorption surface and plastic film.

5 Claims, 3 Drawing Sheets

PLASTIC FILM ELECTROSTATIC ADSORPTION APPARATUS AND ELECTROSTATIC ADSORPTION METHOD

CLAIM OF PRIORITY

This application claims priority of Japanese Patent Application No. 2000-223029, filed Jul. 24, 2000.

BACKGROUND OF THE INVENTION

1. Field of the Invention

The present invention relates to an electrostatic adsorption apparatus for electrostatically adsorbing a plastic film, and a method of electrostatically adsorbing plastic film using this apparatus.

The present application is based on a patent filed in Japan (Japanese Patent Application No. 2000-223029), and the described contents of that Japanese application are contained in a portion of the present specification.

2. Description of the Related Art

It is necessary to fix the plastic films comprised of metal, organic compounds or inorganic compounds and so forth on a sample stand. In cases in which these plastic films are subjected to surface processing and treatment such as heat treatment or plasma treatment, or are adhered or joined with other materials.

Consequently, known methods of the prior art for fixing plastic films on a sample stand include the following:

(1) Methods in which the plastic film is adhered using an adhesive and so forth;
(2) Methods in which the periphery of the plastic film is mechanically fixed using screws, clips, adhesive tape and so forth;
(3) Methods in which the plastic film is fixed by vacuum suction; and,
(4) Methods in which the plastic film is electrostatically adsorbed using electrostatic force.

However, each of the above methods for fixing a plastic film to a sample stand of the prior art has their respective problems.

Namely, in the case of the methods described in (1) above, since it is necessary to uniformly apply adhesive to the plastic film and remove the adhesive following surface treatment, the work was tedious. In addition, since the plastic film easily trap atmospheric gas during adhesion of the plastic film, there was the problem of wrinkles forming in the plastic film.

In addition, since the plastic film expands and deforms due to heat treatment and plasma treatment during surface treatment, there was the problem of the plastic film becoming deformed and separating from a sample stand due to the difference in thermal expansion between the sample stand and plastic film.

Moreover, since the adhesive evaporates when surface treatment is performed in a vacuum, there was the problem of these methods being unable to be used in a vacuum.

In the case of the methods described in (2) above, there was the problem of being unable to process the fixed portion of the plastic film. In addition, there was the problem of wrinkles forming easily in the plastic film due to local differences in tension during fixation. Moreover, the plastic film expanded and deformed due to heat treatment and plasma treatment performed during surface treatment. When the plastic film expands and deforms, there was the problem of the portion of the plastic film not fixed to the sample stand lifting from the sample stand due to the difference in thermal expansion between the sample stand and plastic film.

In the case of the methods described in (3) and (4) above as well, there were the problems of wrinkle formation, deformation and separation in the plastic film. These problems occur due to expansion and deformation of the plastic film caused by heat treatment and plasma treatment during surface treatment and the difference in thermal expansion between the sample stand and plastic film.

In consideration of the above circumstances, the object of the present invention is to provide a plastic film electrostatic adsorption apparatus and an electrostatic adsorption method. That eliminates the need for tedious procedures such as coating and removal of adhesive while also enabling surface treatment to be performed even in a vacuum.

More specifically, the object of the present invention is to provide a plastic film electrostatic adsorption apparatus and electrostatic adsorption method for electrostatically adsorbing a plastic film. That eliminates the occurrence of wrinkling, deformation and separation of the plastic film caused by differences in thermal expansion between the sample stand and plastic film even if the plastic film expands and deforms due to heat treatment or plasma treatment performed during surface treatment of the plastic film.

SUMMARY OF THE INVENTION

The plastic film electrostatic adsorption apparatus of the present invention is a plastic film electrostatic adsorption apparatus comprising an electrostatic adsorption electrode, an insulated dielectric layer that covers the above electrostatic adsorption electrode and has a center line average roughness of the adsorption surface on which the plastic film is placed of 0.5 $\mu$m or less, and a power supply electrode that applies a voltage to the above electrostatic adsorption electrode.

According to this plastic film electrostatic adsorption apparatus, surface treatment can be performed even in a vacuum without requiring tedious procedures such as application and removal of an adhesive. In addition, there is no occurrence of wrinkling, deformation or separation of the plastic film caused by differences in thermal expansion between the electrostatic adsorption surface of the electrostatic adsorption electrode and plastic film. Even if the plastic film expands and deforms due to heat treatment or plasma treatment during surface treatment.

In addition, the above electrostatic adsorption electrode of the plastic film electrostatic adsorption apparatus of the present invention employs a bipolar structure having a positive electrode and negative electrode, and is characterized by its outermost end being homopolar.

According to this plastic film electrostatic adsorption apparatus, the plastic film can be electrostatically adsorbed even in a state in which plasma is not generated. In addition, this plastic film electrostatic adsorption apparatus eliminates the need for tedious procedures such as coating and removal of adhesive. In addition, uniform etching can be performed on the plastic film.

In addition, the interval between the positive electrode and negative electrode that compose the above electrostatic adsorption electrode of the plastic film electrostatic adsorption apparatus of the present invention is characterized as being 1 to 10 times the thickness of the above insulated dielectric layer.

According to this plastic film electrostatic adsorption apparatus, the electrostatic adsorption force that adsorbs the plastic film is partially weakened, thereby making it easier to evacuate atmospheric gas entrapped between the plastic film and electrostatic adsorption electrode and preventing the formation of wrinkles in the plastic film.

In addition, the volumetric resistivity value of the above insulated dielectric layer of the plastic film electrostatic adsorption apparatus of the present invention is characterized as being from $10^8$ to $10^{12}$ Ωcm.

According to this plastic film electrostatic adsorption apparatus, there is no generation of leakage current during electrostatic adsorption of the plastic film. In addition, there is no wrinkling or deformation even when the plastic film expands and deforms due to heat treatment or plasma treatment performed during surface treatment.

In addition, the plastic film electrostatic adsorption method of the present invention is characterized by the surface area of adsorption side of the electrostatic adsorption electrode being 10 to 80% of the surface area on which the plastic film is in contact with the adsorption surface of the electrostatic adsorption electrode when using the above plastic film electrostatic adsorption apparatus.

According to this plastic film electrostatic adsorption method, even if atmospheric gas is entrapped between the electrostatic adsorption electrode and plastic film during electrostatic adsorption of the plastic film, since the entrapped atmospheric gas is easily evacuated, there is no wrinkling or deformation of the plastic film.

In addition, in the plastic film electrostatic adsorption method of the present invention, a plastic film is electrostatically adsorbed onto an adsorption surface of an insulated dielectric layer using the above plastic film electrostatic adsorption apparatus in a state in which the outermost end of the electrostatic adsorption electrode protrudes beyond the outermost edge of the plastic film, and the length of its protrusion is 4 mm or less.

According to this plastic film electrostatic adsorption method, the outer periphery of the plastic film does not lift from the electrostatic adsorption electrode. In addition, there is no roughening of the electrostatically adsorbed surface due to electrical charge concentrating on the electrostatically adsorbed surface of the plastic film on the electrostatic adsorption electrode and increased collision of charged active species during etching treatment and so forth.

In addition, in the plastic film electrostatic adsorption method of the present invention, the electrostatic adsorption voltage is either lowered or the application of electrostatic adsorption voltage is discontinued after electrostatic adsorption of the plastic film using the above plastic film electrostatic adsorption apparatus.

According to this plastic film electrostatic adsorption method, the plastic film slides easily in the horizontal direction on the electrostatic adsorption electrode. Thus, even if atmospheric gas is entrapped between the electrostatic adsorption electrode and plastic film during electrostatic adsorption of the plastic film, if the application of electrostatic adsorption voltage is discontinued, the entrapped atmospheric gas is evacuated easily, thereby preventing wrinkling and deformation of the plastic film.

DESCRIPTION OF THE PREFERRED EMBODIMENTS

Figure 1A:
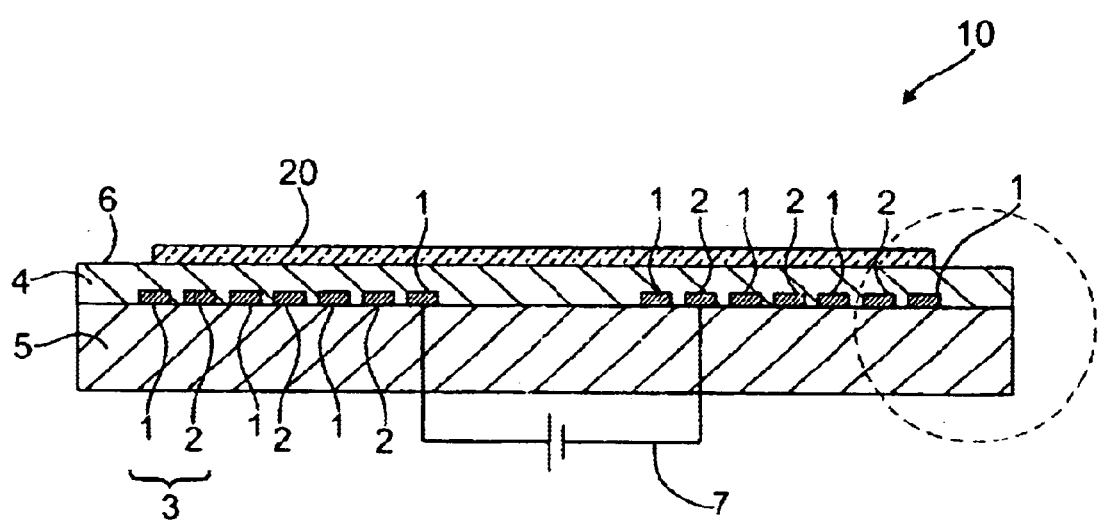
FIG. 1A is a cross-sectional view showing the entire apparatus, and FIG. 1B being an enlarged view of the encircled portion of FIG. 1A.
Figure 1B:
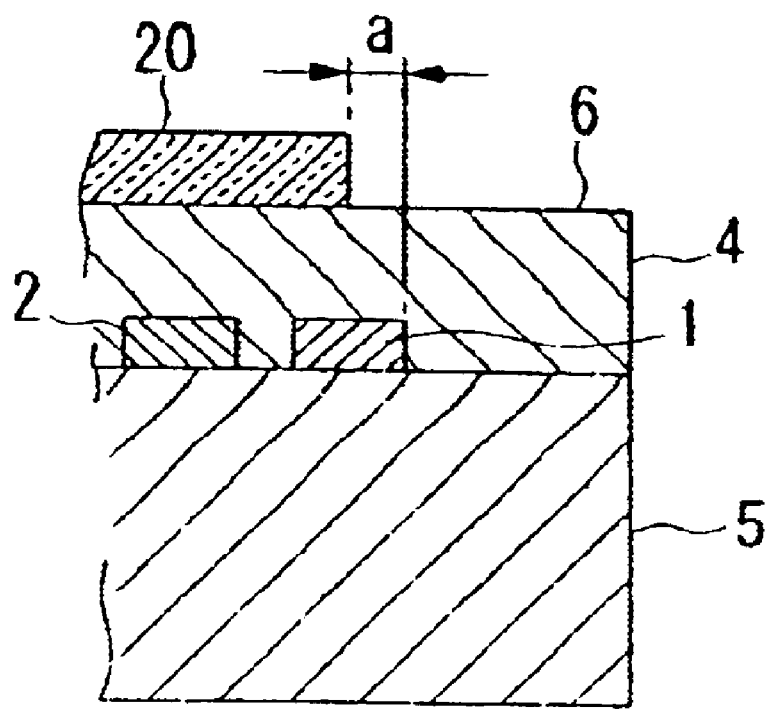
Figure 2:
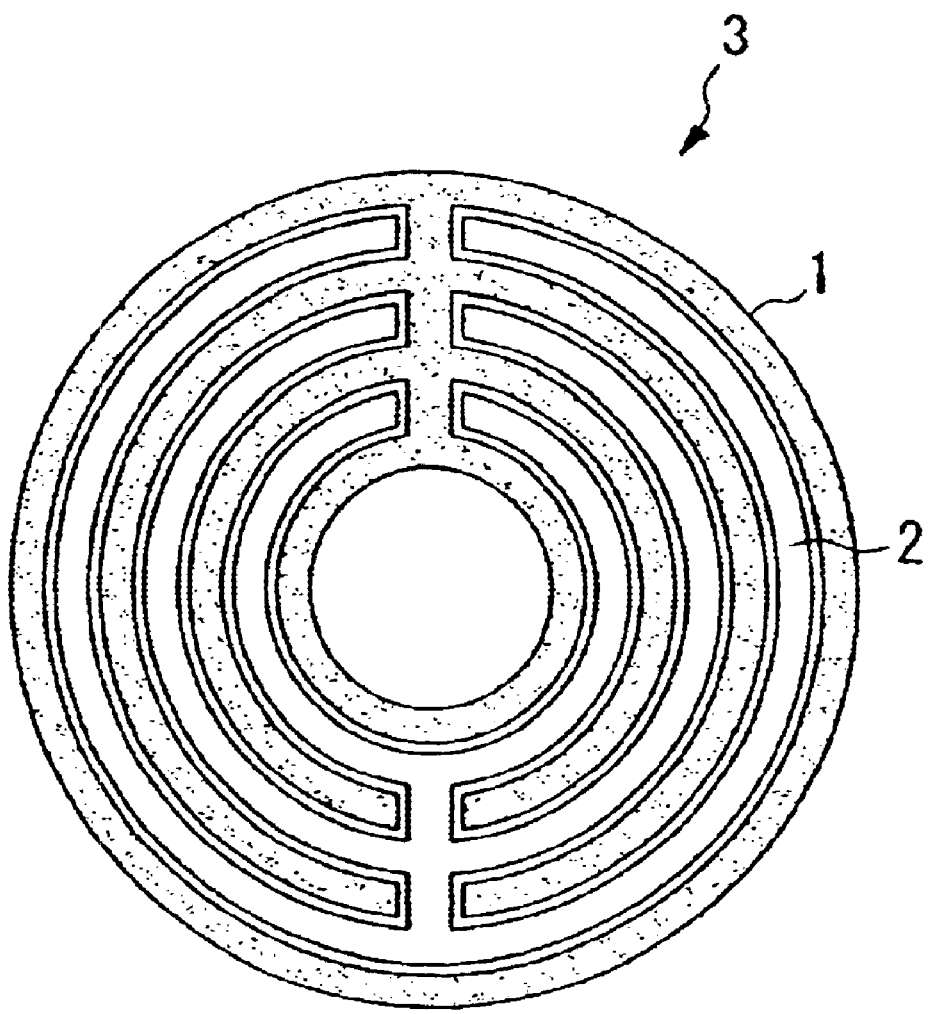
FIG. 2 is an overhead view showing an example of an electrostatic adsorption electrode used in the plastic film electrostatic adsorption apparatus of the present invention.

The following provides a detailed explanation of the present invention with references to FIGS. 1A, 1B and 2.

FIG. 1A is a cross-sectional view showing the entire apparatus, while FIG. 1B is an enlarged view of the encircled portion of FIG. 1A. FIG. 2 is an overhead view showing an example of an electrostatic adsorption apparatus of the present invention.

FIG. 1 is a cross-sectional view showing an example of the plastic film electrostatic adsorption apparatus of the present invention. FIG. 1A is a cross-sectional view showing the entire apparatus, while FIG. 1B is an enlarged view of the encircled portion of FIG. 1A. FIG. 2 is an overhead view showing an example of an electrostatic adsorption electrode used in the plastic film electrostatic adsorption apparatus of the present invention.

Electrostatic adsorption apparatus 10 of this example has a structure in which electrostatic adsorption electrode 3, composed of positive electrode 1 and negative electrode 2 formed on the surface of insulated dielectric layer 5, is covered with insulated dielectric layer 4. In addition, insulated dielectric layer 4 has electrostatic adsorption layer 6, which electrostatically adsorbs plastic film 20 placed thereon, on the surface of insulated dielectric layer 4. In addition, electrostatic adsorption apparatus 10 is equipped with power supply electrode 7 that applies voltage to electrostatic adsorption electrode 3.

The shape of electrostatic adsorption electrode 3 is not restricted to a circular shape as shown in FIG. 2, but rather may have a square shape, rectangular shape or triangular shape. In addition, the size of electrostatic adsorption electrode 3 is set arbitrarily according to the size of plastic film 20.

Electrostatic adsorption electrode 3 is formed from a high melting point metal such as molybdenum or tungsten, or from electrically conductive ceramics such as tantalum carbide or silicon carbide.

In addition, electrostatic adsorption electrode 3 has a structure like that indicated below as shown in FIG. 1A.

Positive electrodes, in the form of circles of different sizes having the same center, are formed over and over on the surface of insulated dielectric layer 5, and all of these circular positive electrodes are partially coupled to form positive electrode 1. Negative electrode 2 is formed in the same manner as positive electrode 1. Electrostatic adsorption electrode 3 has a structure in which each electrode that composes negative electrode 2 is disposed between each electrode that composes positive electrode 1 such that positive electrode 1 and negative electrode 2 are alternately disposed.

As explained above, electrostatic adsorption electrode 3 employs a bipolar structure having positive electrode 1 and negative electrode 2. In addition, the outermost end of electrostatic adsorption electrode 3 that protrudes beyond the outermost edge of plastic film 20 placed on electrostatic adsorption surface 6 is homopolar.

As a result of electrostatic adsorption electrode 3 being disposed in this manner, plastic film 20 can be electrostatically adsorbed even in a state in which plasma and so forth is not generated, thereby being able to provide electrostatic adsorption apparatus 10 having improved workability. In addition, as a result of the outermost end of electrostatic adsorption electrode 3 being homopolar, uniform etching can be performed even during etching treatment and so forth in which concentration of electrical charge occurs most easily on the electrostatic adsorption surface of plastic film 20 on the outermost end of electrostatic adsorption electrode 3.

In addition, the interval between positive electrode 1 and negative electrode 2 of electrostatic adsorption electrode 3 is preferably 1 to 10 times, and more preferably 3 to 6 times, the thickness of insulated dielectric layer 4 on which plastic film 20 is placed.

If the interval between positive electrode 1 and negative electrode 2 is less than 1 time the thickness of insulated dielectric layer 4, electrostatic adsorption force becomes uniform over the entire electrostatic adsorption surface. Thereby eliminating portions where electrostatic adsorption force is weak and making it difficult to evacuate entrapped atmospheric gas, thereby making this undesirable. On the other hand, if the interval between positive electrode 1 and negative electrode 2 is greater than 10 times the thickness of insulated dielectric layer 4, electrostatic adsorption force decreases and it becomes difficult to electrostatically adsorb plastic film 20, thereby making this undesirable as well.

Formation of electrostatic adsorption electrode 3 is performed by forming on the surface of insulated dielectric layer 5 by a method such as screen printing, flame coating or photolithography, or by adhering that in form of a plating or foil.

Furthermore, in the present example, although the composition of electrostatic adsorption electrode 3 employs a bipolar structure having a positive electrode and negative electrode within insulated dielectric layers 4 and 5, one of electrostatic adsorption electrodes 3 may employ a single electrode structure connected to plastic film 20.

Insulated dielectric layers 4 and 5 are formed with a ceramic sintered body composed of aluminum, aluminum nitride and so forth.

In addition, electrostatic adsorption surface 6 of insulated dielectric layer 4, which electrostatically absorbs plastic film 20, by placing plastic film 20 thereon, is polished to a mirrored surface and has a center line average roughness of preferably 0.5 pm or less, and more preferably 0.1 $\mu$m or less. As a result, since the friction between electrostatic adsorption surface 6 and plastic film 20 is reduced. Even if there is expansion and deformation of plastic film 20 due to heat treatment and plasma treatment during surface treatment, since plastic film 20 slides easily in the horizontal direction over electrostatic adsorption surface 6, there is no occurrence of wrinkling, deformation or separation.

In addition, the volumetric specific resistivity value of insulated dielectric layer 4 is preferably $10^8$ to $10^{12}$ $\Omega$cm, and more preferably $10^{10}$ to $10^{11}$ $\Omega$cm, at the working temperature of electrostatic adsorption apparatus 10.

As a result of making the volumetric specific resistivity value of insulated dielectric layer 4 to be within the above range, the suitable range of the electrostatic adsorption force is roughly 20 to 1000 gf/cm$^2$. As a result, there is no generation of leakage current during electrostatic adsorption of plastic film 20. Even if plastic film 20 expands and deforms due to heat treatment and plasma treatment during surface treatment, since it is able to easily slide horizontally over electrostatic adsorption surface 6, there is no occurrence of wrinkling, deformation or separation.

Methods for forming insulated dielectric layer 4 so that the volumetric specific resistivity value of insulated dielectric layer 4 is within the above range include, for example, the methods described below:

(1) a method in which a mixed powder comprising 1 to 10% by weight of silicon carbide powder having a mean particle size of 0.5 $\mu$m or less and the remainder as alumina powder is sintered in a non-oxidizing atmosphere to form a sintered body followed by using this sintered body as insulated dielectric layer 4; and (2) a method in which a mixed powder comprising silicon carbide powder, having a mean particle size of 0.5 $\mu$m or less and an oxide film of 0.1 $\mu$m or less on its surface, and alumina powder is sintered in a non-oxidizing atmosphere to form a sintered body followed by using this sintered body as insulated dielectric layer 4.

In addition, since the thickness of insulated dielectric layer 4 is within a range that facilitates easy processing and prevents the generation of electrical discharge between itself and plastic film 20, it is normally within the range of 100 to 4,000 $\mu$m.

In the plastic film electrostatic adsorption method of the present invention, the surface area of the electrostatic adsorption surface 6 side of electrostatic adsorption electrode 3 is preferably 10 to 80%, more preferably 20 to 60%, and even more preferably 30 to 50%, of the surface area on which plastic film 20 is in contact with electrostatic adsorption surface 6.

As a result of composing in the above manner, even if atmospheric gas is entrapped between electrostatic adsorption surface 6 and plastic film 20 during electrostatic adsorption of plastic film 20, there is no occurrence of wrinkling, deformation or separation in plastic film 20. Because the entrapped atmospheric gas is easily evacuated from the portion having weak electrostatic adsorption force due to the absence of electrostatic adsorption electrode 3 between electrostatic adsorption surface 6 and plastic film 20.

In addition, in the plastic film electrostatic adsorption method of the present invention, plastic film 20 is electrostatically adsorbed onto electrostatic adsorption surface 6 in the state in which the outermost end of electrostatic adsorption electrode 3 protrudes beyond the outermost edge of plastic film 20, and the protruding length a shown in FIG. 1B is preferably 4 mm or less, more preferably 1 mm or less, and practically from 3 to 1 mm.

In this manner, if the outermost end of electrostatic adsorption electrode 3 does not protrude beyond the outermost edge of plastic film 20, the periphery of plastic film 20 ends up lifting from electrostatic adsorption electrode 3 during electrostatic adsorption of plastic film 20, thereby making this undesirable. In addition, if the protruding length exceeds 4 mm, electrical charge accumulates on the electrostatic adsorption surface of plastic film 20 on the protruding electrostatic adsorption electrode 3, thereby increasing collision of charged active species during etching treatment and so forth and causing roughening of the electrostatic adsorption surface, thereby also making this undesirable.

In the plastic film electrostatic adsorption method of the present invention, first of all a direct current voltage (to be referred to as the "electrostatic adsorption voltage") $V_1$ is applied to electrostatic adsorption electrode 3, plastic film 20 is electrostatically adsorbed on electrostatic adsorption surface 6 of insulated dielectric layer 4. And then, after starting surface treatment by heat treatment or plasma treatment on this plastic film 20, either electrostatic adsorption voltage $V_2$ lower than electrostatic adsorption voltage $V_1$ is applied to electrostatic adsorption electrode 3, or the application of electrostatic adsorption voltage is discontinued. So that electrostatic adsorption force is lowered to 0 to 80% of the electrostatic adsorption force during application of the electrostatic adsorption voltage.

In this manner, in the plastic film electrostatic adsorption method of the present invention, by weakening the electrostatic adsorption force after electrostatic adsorption by applying electrostatic adsorption voltage in the manner described above, even if plastic film 20 expands and deforms, it is able to easily slide horizontally over electrostatic adsorption surface 6. In addition, in the plastic film electrostatic adsorption method of the present invention, there is no occurrence of wrinkling, deformation or separation in plastic film 20. Even if atmospheric gas is entrapped between electrostatic adsorption surface 6 and plastic film 20 during electrostatic adsorption, since the entrapped atmospheric gas is evacuated easily by discontinuing application of electrostatic adsorption voltage.

What is claimed is:

1. A plastic film electrostatic adsorption apparatus comprising:
   an electrostatic adsorption electrode;
   an insulated dielectric layer that covers the above electrostatic adsorption electrode and has a center line average roughness of an adsorption surface on which a plastic film is placed of 0.5 $\mu$m or less; and
   a power supply electrode configured to apply a voltage to the above electrostatic adsorption electrode wherein the electrostatic adsorption electrode comprises a bipolar structure having a positive electrode and negative electrode, and the electrostatic adsorption electrode is characterized by an outermost end being homopolar.

2. The plastic film electrostatic adsorption apparatus according claim 1 wherein, the interval between the positive electrode and the negative electrode that compose the above electrostatic adsorption electrode is 1 to 10 times the thickness of the above insulated dielectric layer.

3. The plastic film electrostatic adsorption apparatus according to claim 2 wherein, the volumetric specific resistivity value of the above insulated dielectric layer is from $10^8$ to $10^{12}$ $\Omega$cm.

4. The plastic film electrostatic adsorption apparatus according to claim 1 wherein, the volumetric specific resistivity value of the above insulated dielectric layer is from $10^8$ to $10^{12}$ $\Omega$cm.

5. A plastic film electrostatic adsorption apparatus comprising:
   an electrostatic adsorption electrode;
   an insulated dielectric layer that covers said electrostatic adsorption electrode, said insulated dielectric layer comprising a center line average roughness of an adsorption surface on which a plastic film is placed of 0.5 $\mu$m or less; and
   a power supply electrode configured to apply a voltage to the above electrostatic adsorption electrode wherein the electrostatic adsorption electrode comprises a bipolar structure having a positive electrode and negative electrode, said positive electrode and said negative electrode being alternately disposed.

* * * * *